(12) United States Patent
Schuberth

(10) Patent No.: US 8,959,983 B2
(45) Date of Patent: Feb. 24, 2015

(54) METHOD FOR ACOUSTICALLY LOCALIZING LEAKS IN PIPING SYSTEMS

(75) Inventor: Harald Schuberth, Breitengössbach (DE)

(73) Assignee: Seba Dynatronic Mess-und Ortungstechnik GmbH, Baunach (DE)

( * ) Notice: Subject to any disclaimer, the term of this patent is extended or adjusted under 35 U.S.C. 154(b) by 354 days.

(21) Appl. No.: 13/589,271

(22) Filed: Aug. 20, 2012

(65) Prior Publication Data

US 2013/0213482 A1    Aug. 22, 2013

(30) Foreign Application Priority Data

Sep. 5, 2011   (DE) .................... 10 2011 112 304
Feb. 25, 2012  (DE) .................... 10 2012 003 822

(51) Int. Cl.
| | | |
|---|---|---|
| G01M 3/04 | (2006.01) | |
| G01M 3/24 | (2006.01) | |
| G06F 17/10 | (2006.01) | |
| F17D 5/06 | (2006.01) | |
| G01M 3/00 | (2006.01) | |

(52) U.S. Cl.
CPC ....... *G06F 17/10* (2013.01); *F17D 5/06* (2013.01); *G01M 3/243* (2013.01); *G01M 3/002* (2013.01)
USPC ...................................... 73/40.5 A

(58) Field of Classification Search
CPC . G01M 3/243; G01M 3/2815; G01M 3/2807; G01M 3/24; G01M 3/26; G01M 3/007; G01M 3/18; G01M 3/2892; F17D 5/06; F17D 5/02; F17D 5/00
USPC ........ 73/40.5 A, 40, 40.5 R, 49.1, 592, 29.04, 73/587, 861.18; 702/51, 54
See application file for complete search history.

(56) References Cited

U.S. PATENT DOCUMENTS

| | | | | |
|---|---|---|---|---|
| 4,046,220 A | * | 9/1977 | Glenn, Jr. ................... | 181/105 |
| 4,457,163 A | * | 7/1984 | Jackle ...................... | 73/40.5 A |
| 4,640,121 A | * | 2/1987 | Leuker et al. ............. | 73/40.5 A |

FOREIGN PATENT DOCUMENTS

| | | | | |
|---|---|---|---|---|
| DE | 33 36 245 | | 4/1985 | |
| DE | 31 12 829 | | 1/1986 | |
| DE | 10 2005 033 491 | * | 1/2007 | ............ F17D 5/02 |

* cited by examiner

*Primary Examiner* — Hezron E Williams
*Assistant Examiner* — Marrit Eyassu
(74) *Attorney, Agent, or Firm* — Faegre Baker Daniels LLP

(57) ABSTRACT

Method for acoustically locating leaks in underground or aboveground piping systems, in which at least two noise data loggers receiving the leak noise and being arranged in mutual distance from one another are brought in physical contact with the piping system to be examined and measure simultaneously the noise level (dB) and the frequency of a leak, whereas both measured values of frequency and noise level are combined in a single value (ESA), whereas the ESA value is calculated from the decimal logarithm of the frequency of the leak noise multiplied with the logarithmic level value of the leak noise multiplied with a constant factor.

16 Claims, 4 Drawing Sheets

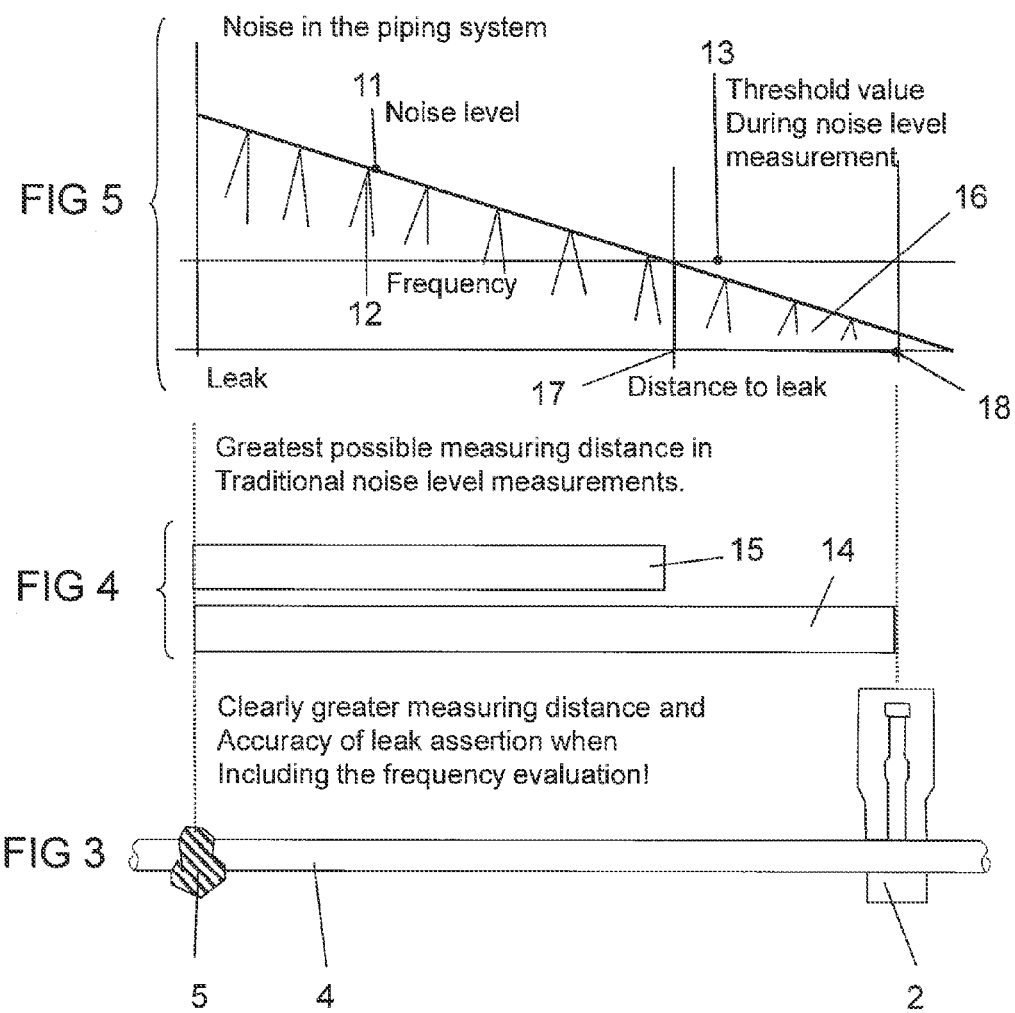

Figure 1:
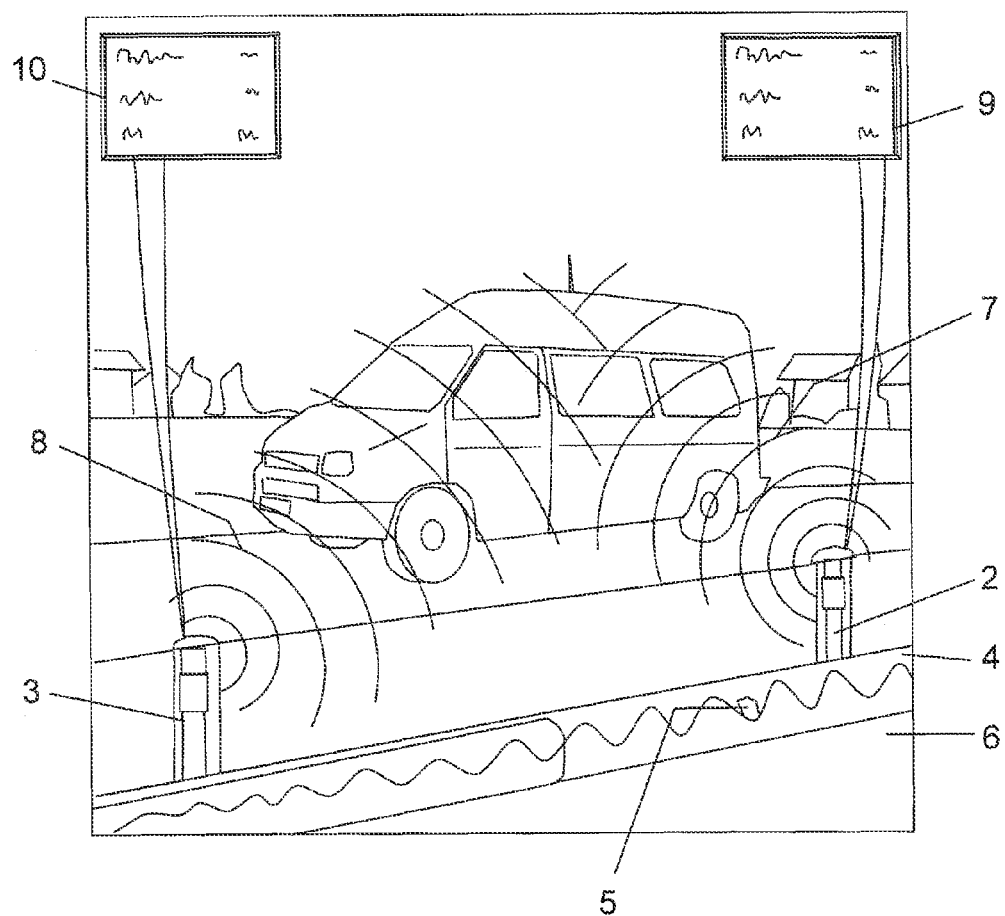

$$ESA := Log_{10}(fre) * lev * 2/3$$

14   12   22

METHOD FOR ACOUSTICALLY LOCALIZING LEAKS IN PIPING SYSTEMS

The invention concerns a method for acoustically localizing leaks in underground or aboveground piping systems according to the preamble of Claim 1.

In particular, the invention concerns a method for localizing leaks in drinking water pipelines or any other piping systems, through which a liquid medium flows.

For example, such pipes involve also aboveground or underground pipes for kerosene supply on airports and other piping systems, through which a liquid medium flows.

The method according to the preamble of Claim 1 is based on a method of the same applicant and involves a permanent control of pipes, especially drinking water pipelines.

It is known that an installation of pipes involves tightly connecting the drinking water pipelines at specific places with noise data loggers, which results in the fact that a drinking water pipeline is permanently controlled by the permanently installed noise data logger.

Preferably, each noise data logger works with an acceleration sensor, which listens as a body sound microphone to the structure-borne noise at the flowing pipe, which changes when the pipe has a leak and the leak noise spreads along the pipe to be controlled.

In this regard, it is generally known to prepare the measured value acquisition in the noise data logger via the acceleration sensor in such a way that the noise level at the pipe to be controlled and the frequency of the leak noise are measured.

However, previously it has not been known to reasonable inter-relate the two recorded values (noise level and frequency of interference) and determine from said values a meaningful variable which combines both values.

Therefore, the invention is based on the objective of further developing a method for acoustically localizing leaks in pipes in such a way that it is easier fix the user to analyze the leak noise and the associated frequency and, at the same time, reach a qualitative conclusion regarding the leak-related relevance of a measured signal.

The solution of the problem is characterized by the technical teaching of Claim 1.

An important characteristic is that the level and frequency of the leak noise are combined to a single value, which is subsequently called ESA value, which represents the term "extended signal analysis".

It actually turned out that the ESA value thus determined has special significance.

The user, who evaluates the whole set-up, does not have the possibility to make a meaningful evaluation of all values, i.e., level frequency and volume. This is where the invention comes in, which provides for the first time a comprehensive overview of the leak situation on a map by means of a mathematical formula that results in the ESA value, provided each of the individual locations of noise data loggers marked on a geographic map of the environment is assigned an ESA value. The graphic overview is further improved by associating the parameter of the determined ESA value with a color scale.

Low ESA values are depicted in dark blue and gradually change via red to yellow. When a person watches the different loggers on the map and notices one that flashes yellow he knows that a critical leak has developed at this place. In the area surrounding the logger marked to be critical the other loggers flash in different—possibly uncritical—colors, up to the loggers that show with their blue color an uncritical condition of the intercepted pipe. This provides for the possibility of including in the examination the loggers on the map marked in the surrounding area of the leak.

It can actually not be expected that the logger marked to be critical is located directly above the leak location. Therefore, it is necessary to evaluate optically even the color displays of the loggers that are in the proximity of the logger marked to be critical. From the different color-coded loggers in the proximity of the critical logger it is very likely to identify the leak location.

Accordingly, the ESA formula with the two variables is an excellent indicator for specifying the distance to the leak.

Both measured values (level and frequency) lead to the proximity of the leak. When moving away from the leak the level decreases and the high frequencies are increasingly diminished. The whole procedure is a type of low-pass filter. This results in improved safety compared to evaluating only the level or only the frequency.

However, when using only the level or only the frequency for locating a leak, it is more likely to reach a wrong conclusion. But when combining both values, there is a greater reliability of specifying the leak location.

With the use of the formula the frequency is logarithmically established. The level has already been logarithmically calculated during acquisition. It involves a value of between 0 and 60 dB. Accordingly, the volume also has a value of 0 and 60 dB.

Preferably, the frequency ranges between 0-2.500 Hz and the volume between 0 and 60 dB. When indicating the absolute volume level in dB calibration is not required.

The leak noise is measured by means of acceleration sensors which are in direct contact with the pipe to be measures or the hydrant branching off from the pipe. The pipe can consist of metal or plastic material.

What is measured is the energy received by the acceleration sensor. It involves an acceleration value G. One dB volume corresponds approximately to an acceleration of 10 micro G.

A different embodiment of the invention provides for measuring the volume with a hydrophone instead of an acceleration sensor.

The inventive subject matter of the present invention is represented not only by the subject matter of the individual claims but also by a combination of individual claims.

All statements and characteristics disclosed in the documents, including the abstract, as well as the spatial design shown in the drawings are claimed to be an essential part of the invention, provided that they are new on an individual bases, as well as in combination, when compared to prior art.

Subsequently, the invention is described in more detail by means of a drawing showing only one method of execution. The drawing and its description shows further invention-based characteristics and advantages of the invention.

It is shown:

FIG. 1: A diagram of an arrangement according to the invention in which a leak noise is determined using two noise data loggers arranged at a pipe.

Figure 2:
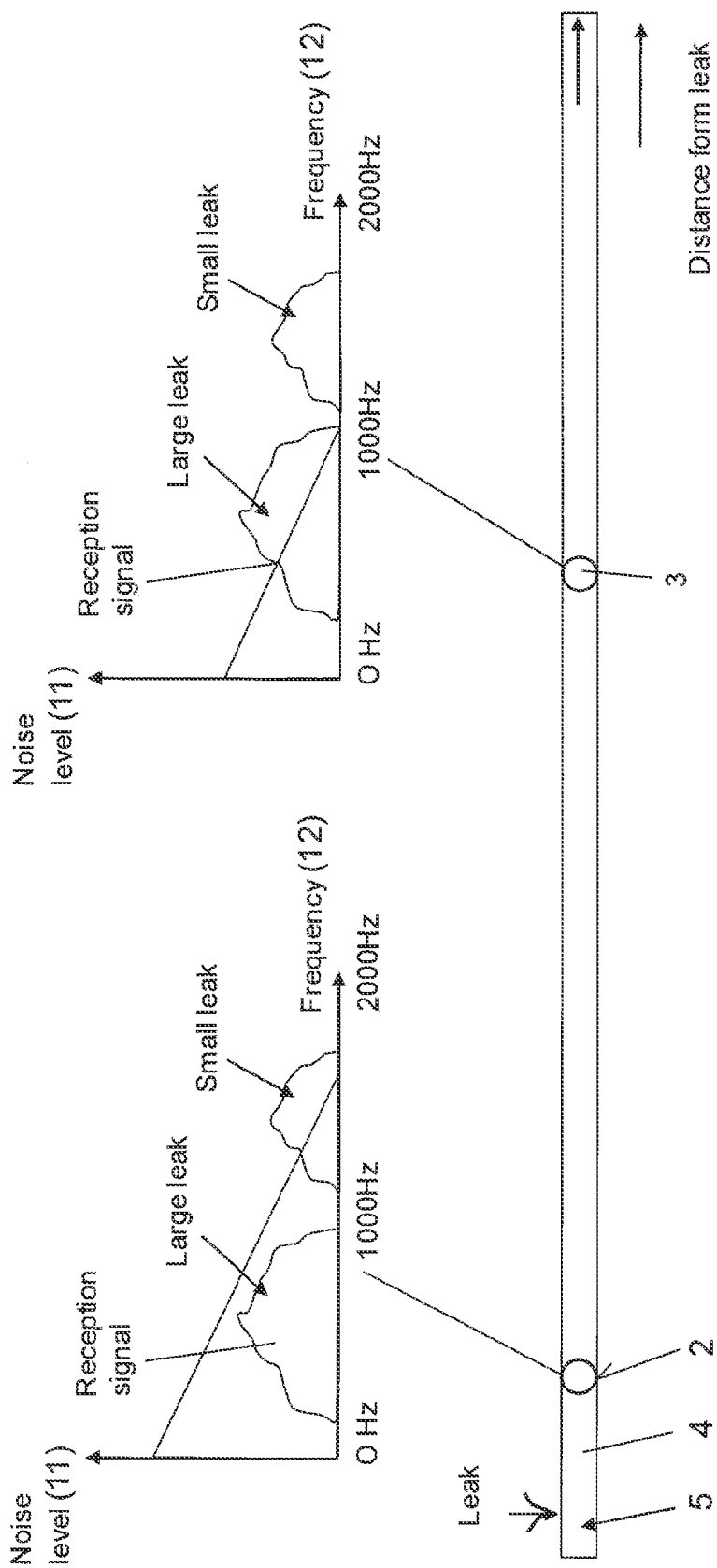

FIG. 2: The arrangement according to FIG. 1, wherein the signal outputs of the noise data logger are shown.

FIG. 3: The lateral view of a pipe showing signs of a leak connected to a noise data logger.

FIG. 4: A comparison of the measurement distance with a customary noise level measurement in contrast with the invention-based ESA value.

FIG. 5: A diagram in which the noise level and frequency are recorded by means of the distance to the leak location.

Figures 6, 7:
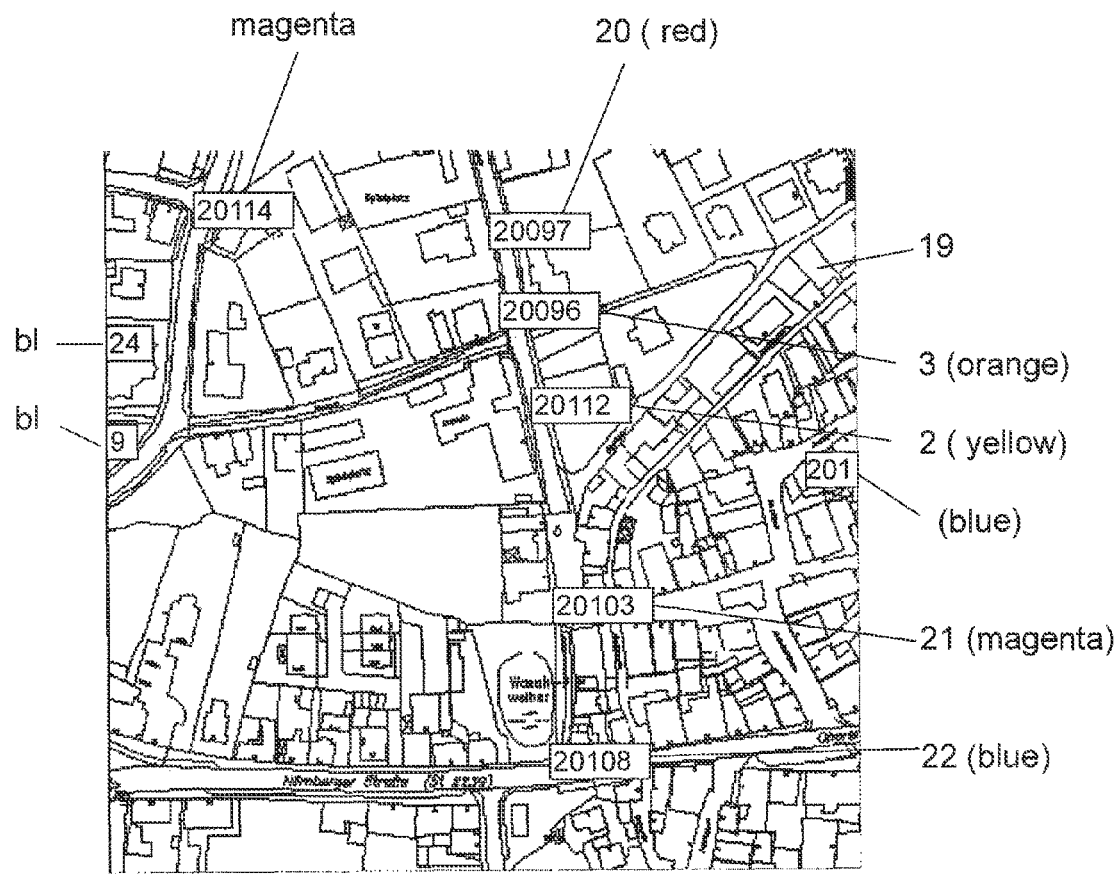

FIG. 6: A diagram of the map display of a map of the environment with a drinking water pipeline arranged there specifying the location of different noise data loggers and their ESA values.

FIG. 7: The invention-based ESA formula.

FIG. 1 shows a diagram of a measuring vehicle 1 which is connected with two noise data loggers 2, 3 via a wireless radio contact, which are in physical contact with an underground piping system 4 and which record the noise level and frequency at the coming of the piping system 4 by means of acceleration sensors or hydrophones.

For example, when a leak 5 occurs in the proximity of the piping system, the liquid medium, for example drinking water, flows into the soil 6 and generates a leaking noise which spreads via the casing of the piping system 4 in both directions.

Both noise data loggers 2, 3 arranged at a distance from one another record the noise level of the flowing leak 5, as well as the frequency, and send both values—together with further values—for example, the logger ID 9, 10 wireless to the passing measuring vehicle 1.

The wireless data transmission 7, 8 from the noise data loggers 2, 3 to the measuring vehicle 1 shown here can certainly be also implemented in a different manner, for example, in the form of a network to a central computer.

Instead of wireless data transmission 7, 8, data transmission can also take place in wire-connected systems.

FIG. 2 shows a drinking water pipeline 4 which developed a leak 5 on the left side and, at the same time, it shows the noise level depending on the frequency of both noise data loggers 2, 3.

Here it is shown that when the noise data logger 3 is located at great distance from the leak 5 the small leaks can no longer be detected, because the receiving signal of the noise data logger 3 is below the detection threshold.

The noise data logger 2 located in the proximity of the leak 5 can detect a large leak and a small leak, because the receiving signal in the higher frequency range is able to detect also a small leak.

FIGS. 3 to 5 show the advantages of the invention-based method compared to prior art.

In FIG. 3, on the other hand, in accordance with FIG. 2, the leak 5 to be detected is located on the left side of the piping system 5, whereas the data acquisition is shown to be at the noise data logger 2.

In FIG. 4 the level value 15 shows that in a traditional noise level measurement only a distance up to position 17 (see FIG. 5) from the leak 5 can be detected.

However, when an ESA value 14 is formed according to the invention-based formula, it is still possible to detect the leak even at larger distances, according to FIG. 5 between positions 17 and 18.

This is shown in FIG. 5, where it can be observed that the noise level 11 is applied via the distance of the leak 5 and, at the same time, the frequency 12 is shown.

In customary noise level measurements the threshold value 13 was important for detecting the leak and FIG. 5 shows that in customary noise level measurements a leak can no longer be detected between the positions 17 and 18.

Therefore FIG. 5 shows on the right side a triangular improvement curve 16, which makes it clear that in an evaluation of the ESA value leak detection is still possible at large distances from the leak, even between positions 17 and 18.

FIG. 6 shows a map of the environment 19 of a village in which a piping system 4 to be controlled is located, wherein a number of noise data loggers 2, 3, 20, 21, 22 are arranged along the piping system 4.

If now a leak occurs at the height of the noise data logger 2, the highest ESA value 14 is assigned to this noise data logger 2, because said noise data logger 2 is located closest to the leak. As a result, the noise data logger 20112 located there would be marked yellow on the map of the environment.

However, the noise data logger 3 with the number 20096 located further downstream has an orange color on the map, so as to show that it is located further away from the leak. A further noise data logger 20, which is marked on the map with the number 20097, is displayed, for example, in red showing that this noise data logger 20 is removed even further from the leak.

However, the noise data logger 21 located upstream receives a magenta-red color showing that it is also in the proximity of the leak 5.

The noise data logger 22 with the number 20108 receives, for example, a blue color because it does not have a critical ESA value.

The same applies to the noise data logger with the number 20114 and the noise data loggers shown only partially further left on the outside, all of which have a blue color.

Consequently, the user is provided with a quick, graphically clearly understandable situation of a piping system 4 when he examines the ESA values assigned to the noise data loggers and, at the same time, looks at the location of the noise data loggers on the map of the environment 19.

Then he is able to pinpoint very quickly the noise data logger 2 in the proximity of the highest ESA value 14 and located the leak.

Subsequently, the invention-based formula is rendered as follows:

$$ESA := \text{Log}_{10}(\text{fre}) * \text{lev} * 2/3$$

and separately specified in FIG. 7,

According to the specified formula the new ESA value results from multiplying the decadic logarithm of the frequency 12 with the noise level 11 and a constant factor.

The factor mentioned last is merely a scaling factor, which scales the determined ESA value 14 to a specific range.

instead of the factor 2/, it is also possible to use different factors, for example, 3/5 or 1/3. The factor can consist also of a whole number. The ESA value is calculated from the following calculations for the level lev and the frequency fre.

Determining the Noise Level 11

The noise level 11 of the leak is determined by means of an acceleration sensor (body sound microphone) at the location of the noise data logger 2, 3, 20-22, then the respectively determined amplitude signal is digital converted and read into the controller of the noise data logger 2, 3, 20-22. The noise level 11 (subsequently depicted also as "lev") is calculated as follows:

a) $a_n$ is a sample value of the noise level b) Sum of a block N of, for example, 1024 successive sample values of the noise signal (time signal)

c) Then the level lev is calculated as logarithm to the base 10 of the effective value of the time signal amplitude:

$$lev = 20 \times \log_{10} \sqrt{\frac{\sum_{n=1}^{1024} a_n^2}{1024}}$$

d) The unit of the level is indicated in "dB".

Determining the Frequency 12 of the Noise

To calculate the frequency 12 the frequency is determined with the greatest spectral amplitude. According to general use, the spectral amplitude results from the amplitude and phase spectrum of the complex Fourier series. The resulting spectral amplitudes of the one-sided spectrum can be measured and correspond to the coefficient of the real Cosine form. The coefficients (spectral amplitudes) of the Fourier series without DC component correspond to the equation:

$$U_n = 2\hat{u}\frac{\tau}{T}\frac{\sin\frac{n\pi\tau}{T}}{\frac{n\pi\tau}{T}}$$

a) The block of sample values of the noise value determined under 1. b) is subordinate to an FFT and transformed into the frequency range.
b) For each node the sum is formed from the imaginary and real portion. This sum represents the spectral amplitude of the respective frequency.
c) The frequency of the node with the highest amplitude in the full range is considered to be the frequency fre of the signal.
d) The unit of the frequency is indicated in "Hz".

DRAWING LEGEND

1. Measuring vehicle
2. Noise data logger
3. Noise data logger
4. Piping system
5. Leak
6. Soil
7. Data transmission
8. Data transmission
9. Logger ID
10. Logger ID
11. Noise level
12. Frequency
13. Threshold value
14. ESA value
15. Level value
16. Improvement curve
17. Position
18. Position
19. Map of the environment
20. Noise data logger
21. Noise data logger
22. Noise data logger

The invention claimed is:

1. Method for acoustically locating leaks in underground or aboveground piping systems, in which at least two noise data loggers receiving the leak noise and being arranged in mutual distance from one another are brought in physical contact with the piping system to be examined and measure simultaneously the noise level (dB) and the frequency (Hz) of a leak, characterized in that both measured values of frequency and noise level are combined in a single value (ESA), whereas the ESA value is calculated from the decimal logarithm of the frequency of the leak noise multiplied with the level value of the leak noise multiplied with a constant factor.

2. Method according to claim 1, characterized in that the ESA value is calculated according to the following formula, wherein the constant factor has the value ⅔:

$$ESA := \text{Log}_{10}(\text{fre})*\text{lev}*\tfrac{2}{3}.$$

3. Method according to claim 1, characterized in that the noise level of the leak is determined by means of an acceleration sensor at the location of the noise data logger, the respectively determined amplitude signal is subsequently digitally converted and read into the controller of the noise data logger and calculated according to the formula:

$$lev = 20 \times \log_{10}\sqrt{\frac{\sum_{n=1}^{1024} a_n^2}{1024}}.$$

4. Method according to claim 1, characterized in that the frequency of the noise level is obtained from a Fast Fourier Transformation (FFT), the input parameter of which corresponds to a block of sample values of the noise value and at the output of which the value thus determined is transformed into a frequency range, that for each node the absolute sum is formed from the imaginary and real portion and that the frequency of the node with the highest sum is considered to be the frequency fre of the signal.

5. Method according to claim 1, characterized in that the ESA value recorded for each noise data logger depending on its absolute value is assigned a color or brightness gradation on a graphical user interface and that the graphical user interface displays the geographic location of the noise data loggers along the piping system.

6. Method according to claim 1, characterized in that the ESA value makes the probability of a leak visible and shows the leak position in relation to other loggers.

7. Method according to claim 1, characterized in that a permanent pipeline control of the piping system designed as drinking water pipelines is performed.

8. Method according to claim 2, characterized in that the noise level of the leak is determined by means of an acceleration sensor at the location of the noise data logger, the respectively determined amplitude signal is subsequently digitally converted and read into the controller of the noise data logger and calculated according to the formula:

$$lev = 20 \times \log_{10}\sqrt{\frac{\sum_{n=1}^{1024} a_n^2}{1024}}.$$

9. Method according to claim 2, characterized in that the frequency of the noise level is obtained from a Fast Fourier Transformation (FFT), the input parameter of which corresponds to a block of sample values of the noise value and at the output of which the value thus determined is transformed into a frequency range, that for each node the absolute sum is formed from the imaginary and real portion and that the frequency of the node with the highest sum is considered to be the frequency fre of the signal.

10. Method according to claim 3, characterized in that the frequency of the noise level is obtained from a Fast Fourier Transformation (FFT), the input parameter of which corresponds to a block of sample values of the noise value and at the output of which the value thus determined is transformed into a frequency range, that for each node the absolute sum is formed from the imaginary and real portion and that the frequency of the node with the highest sum is considered to be the frequency fre of the signal.

11. Method according to claim 2, characterized in that the ESA value recorded for each noise data logger depending on its absolute value is assigned a color or brightness gradation on a graphical user interface and that the graphical user interface displays the geographic location of the noise data loggers along the piping system.

12. Method according to claim 3, characterized in that the ESA value recorded for each noise data logger depending on its absolute value is assigned a color or brightness gradation on a graphical user interface and that the graphical user interface displays the geographic location of the noise data loggers along the piping system.

13. Method according to claim 4, characterized in that the ESA value recorded for each noise data logger depending on its absolute value is assigned a color or brightness gradation on a graphical user interface and that the graphical user interface displays the geographic location of the noise data loggers along the piping system.

14. Method according to claim 1, characterized in that the ESA value makes the probability of a leak visible and shows the leak position in relation to other loggers.

15. Method according to claim 2, characterized in that a permanent pipeline control of the piping system designed as drinking water pipelines is performed.

16. Method according to claim 3, characterized in that a permanent pipeline control of the piping system designed as drinking water pipelines is performed.

\* \* \* \* \*